(12) United States Patent
Pasqualini et al.

(10) Patent No.: US 6,491,469 B1
(45) Date of Patent: Dec. 10, 2002

(54) CONNECTING SYSTEM BETWEEN WEARING PARTS MOUNTED ONTO TOOLS AND RECEPTACLES IN USE ON CONSTRUCTION MACHINERY AND EQUIPMENT

(75) Inventors: Charles Pasqualini, Feurs; Jean Marc Pasqualini, Mornant; Sylvain Pasqualni, Lumbreg; Alain Ducrot, Gumieres, all of (FR)

(73) Assignees: AFE Metal S.A. (FR); Fuerst S.A. (FR)

( * ) Notice: Subject to any disclaimer, the term of this patent is extended or adjusted under 35 U.S.C. 154(b) by 0 days.

(21) Appl. No.: 09/552,436

(22) Filed: Apr. 17, 2000

(30) Foreign Application Priority Data

Apr. 19, 1999 (FR) ............................................. 99 05068

(51) Int. Cl.$^7$ .................................................. E02F 9/28
(52) U.S. Cl. ................. 403/318; 403/379.4; 403/379.2; 37/455
(58) Field of Search ............................... 403/378, 379.4, 403/379.2, 318; 37/455, 456, 457, 458

(56) References Cited

U.S. PATENT DOCUMENTS

| | | | |
|---|---|---|---|
| 3,019,537 A | | 2/1962 | Stephenson |
| 3,410,010 A | | 11/1968 | Ratkowski |
| 3,520,224 A | * | 7/1970 | Hensley et al. ............ 37/457 X |
| 4,182,058 A | * | 1/1980 | Poncin .......................... 37/458 |
| 4,455,771 A | * | 6/1984 | Poncin .......................... 37/458 |
| 4,602,445 A | * | 7/1986 | Nilsson ......................... 37/457 |
| 4,811,505 A | * | 3/1989 | Emrich ......................... 37/457 |
| 4,823,487 A | * | 4/1989 | Robinson ...................... 37/457 |
| 4,903,420 A | * | 2/1990 | Krietzberg et al. .. 403/379.4 X |
| 4,965,945 A | * | 10/1990 | Emrich ......................... 37/456 |
| 5,068,986 A | | 12/1991 | Jones |
| 5,469,648 A | * | 11/1995 | Jones et al. ................... 37/457 |
| 5,491,915 A | * | 2/1996 | Robinson ...................... 37/458 |
| 5,802,752 A | * | 9/1998 | Quarfordt ..................... 37/452 |

FOREIGN PATENT DOCUMENTS

| | | |
|---|---|---|
| EP | 618334 | 10/1994 |
| WO | 94 18401 | 8/1994 |

* cited by examiner

Primary Examiner—Lynne H. Browne
Assistant Examiner—John R. Cottingham
(74) Attorney, Agent, or Firm—Wall Marjama & Bilinski LLP

(57) ABSTRACT

Apparatus for joining a tooth to an interlocked adaptor of a construction tool having a keyway passing through the interlocked tooth and adaptor. An L-shaped elongated key is inserted into the keyway so that the two sides of the key form a channel with the keyway which is filled with an elastic filler material. The key also has recessed areas which form recesses with the keyway which are also filled with the elastic filler material. One end of the key contains a plug to prevent the filler material from passing out of the channel.

12 Claims, 7 Drawing Sheets

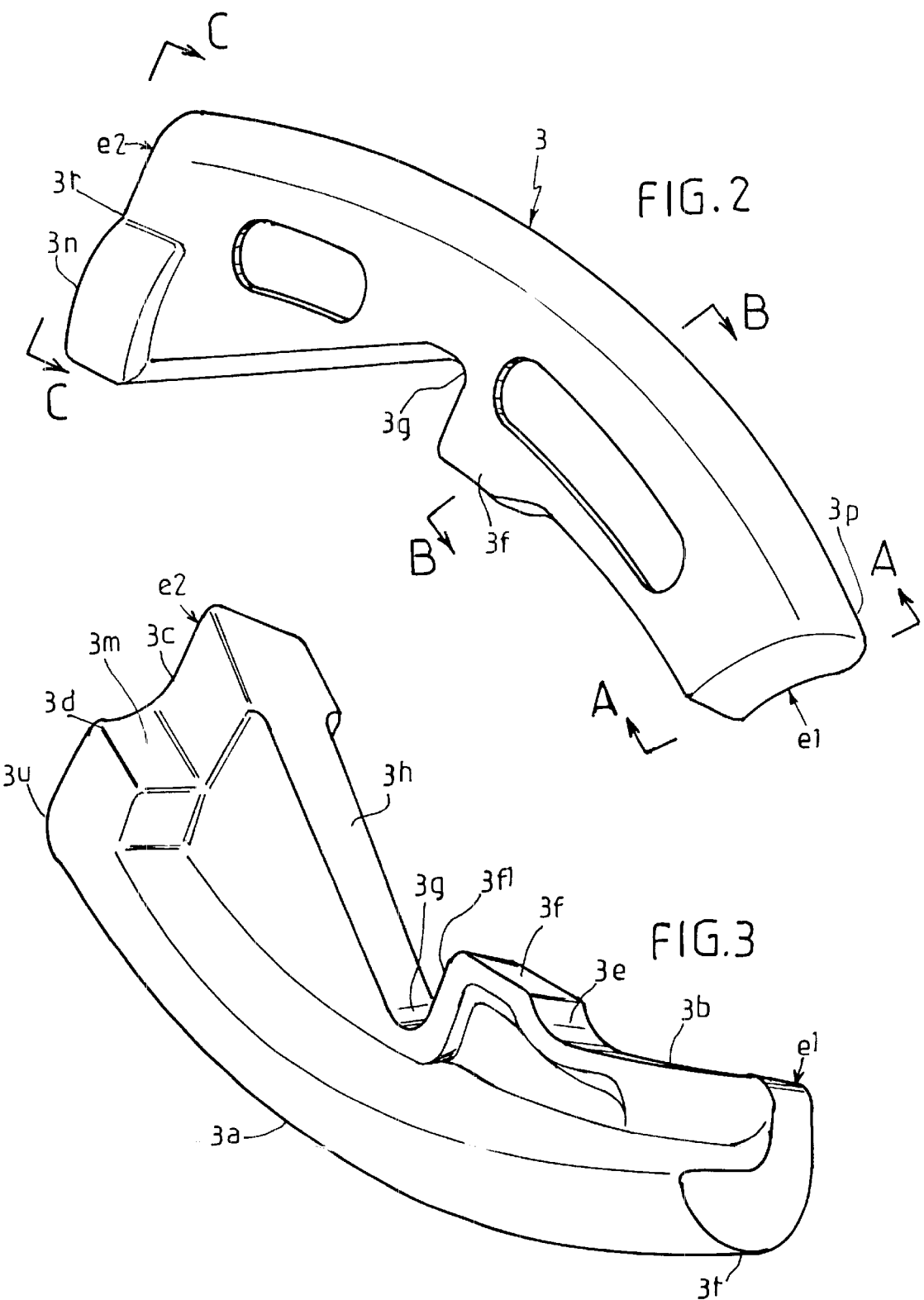

CONNECTING SYSTEM BETWEEN WEARING PARTS MOUNTED ONTO TOOLS AND RECEPTACLES IN USE ON CONSTRUCTION MACHINERY AND EQUIPMENT

BACKGROUND OF THE INVENTION

The invention relates to the technical sector of construction machines using buckets, scoops, dippers and other receptacles designed to scrape or load materials or similar in order to transport these from a given location to other work stations using construction machines and equipment.

Applicants have previously developed a system and process for connecting wearing parts for such applications as mentioned before awarded European patent 618.334.

Briefly stated, the system connecting wearing parts such as removable teeth and shaped adapters to tool ends and receptacles is remarkable in that the tooth and the adapter are provided at at least one of their contact sides and/or thickness with one or more additional configurations to constitute areas and hollows for introducing, holding, retaining and removing a filler material that, placed after the installation of the tooth on the adapter, will constitute at least in these areas an absolute contact between the tooth and the adapter, allowing the latter to accept stresses and strains on the largest surfaces, said material, being fluid and self-deformable providing, once solidified, the connection between the tooth and the adapter.

The function of the additional holding configuration or configurations designed to be filled with and retain the material is to keep in place the mass or masses of the elastic material allowing it to be compressed or to expand while multidirectional mechanical forces are transmitted to the adapter as the tooth is operating.

The system referred to before also includes a key that contributes to linking the assembly.

The system referred to before and the process related to it defined in patent EP 618.334 have been further tested under existing loads that appear and result from the use of the patent referred to.

These complementary tests are likewise applicable to the connection of the tooth and the adapter using a key as the connecting means. The use of keys is well-known in itself and applicants have so stated, citing numerous examples in the European patent mentioned.

SUMMARY OF THE INVENTION

Within the framework of their research, applicants have set out to optimise the use of the system connecting the tooth to the adapter using highly particular configurations to obtain very efficient assemblies.

Said research and tests have led to the development and selection of specific tooth, adapter and key shapes that eliminate any risk of losing the key when in use, and providing conditions facilitating the installation and removal of teeth on-site while obtaining at each and every replacement the initial, high-quality of assembly.

Another purpose according to the invention was the design and selection of a filler material as regards its nature and characteristics.

According to a first aspect, the system connecting wearing parts of the tooth and adapter type mounted onto the end of tools and receptacles in use on construction machines and equipment of the type where the tooth and the adapter are provided at at least one of their contact sides and/or thickness with one or more additional configurations to constitute areas and hollows for introducing, holding, retaining and removing a filler material that, placed after the installation of the tooth on the adapter will, with the additional use of a key, provide for contact between the tooth, the adapter and the key, is characteristic in that:

the key, placed vertically, has a curvilinear segment configuration with an increasing thickness, said key having a transverse, L-type configuration, said key having areas that are anchoring areas for the elastic filler material, said key being shaped as to its lower part to function as a plug when said material is inserted;

the tooth, as regards its top and bottom surfaces, is provided with peripheral, symmetrical openings to allow the key to be entered from below, said openings having symmetrical profiles for the introduction of the filler material, for guiding, locking and ensuring that the L-profiled key acts as a plug;

the adapter has profiled openings fitting the key with a curvilinear inner configuration at the rear to provide a contactless fit of the key, the remaining openings having lands providing momentary support of the key as it takes up extremely high wrenching forces.

BRIEF DESCRIPTION OF THE DRAWINGS

The foregoing and additional characteristics clearly emerge from the description.

The invention is hereafter explained merely by way of example in greater detail with the aid of the appended drawings in which:

FIG. 2 is a perspective view of the specific key as seen from the rear;

FIG. 3 is a perspective view of said specific key as seen from the front;

DESCRIPTION OF THE INVENTION

In order that the present invention may more readily be understood, the following description is given, merely by way of example, reference being made to the accompanying drawings.

The assembly system of wearing parts used in the applications under consideration comprises four components, viz.: a tooth (1), an adapter (2), a key (3) and an elastic filler (4), the latter being used to form a firm link between the parts of the assembly and take up the forces resulting from loads when said wearing parts are used on construction machines and equipment and keep the key in place during operation.

We shall describe the three component parts, the key, the tooth and the adapter, the highly specific shapes of which result from research undertaken to optimise the assembly and improve the performance of the system.

Figure 1:
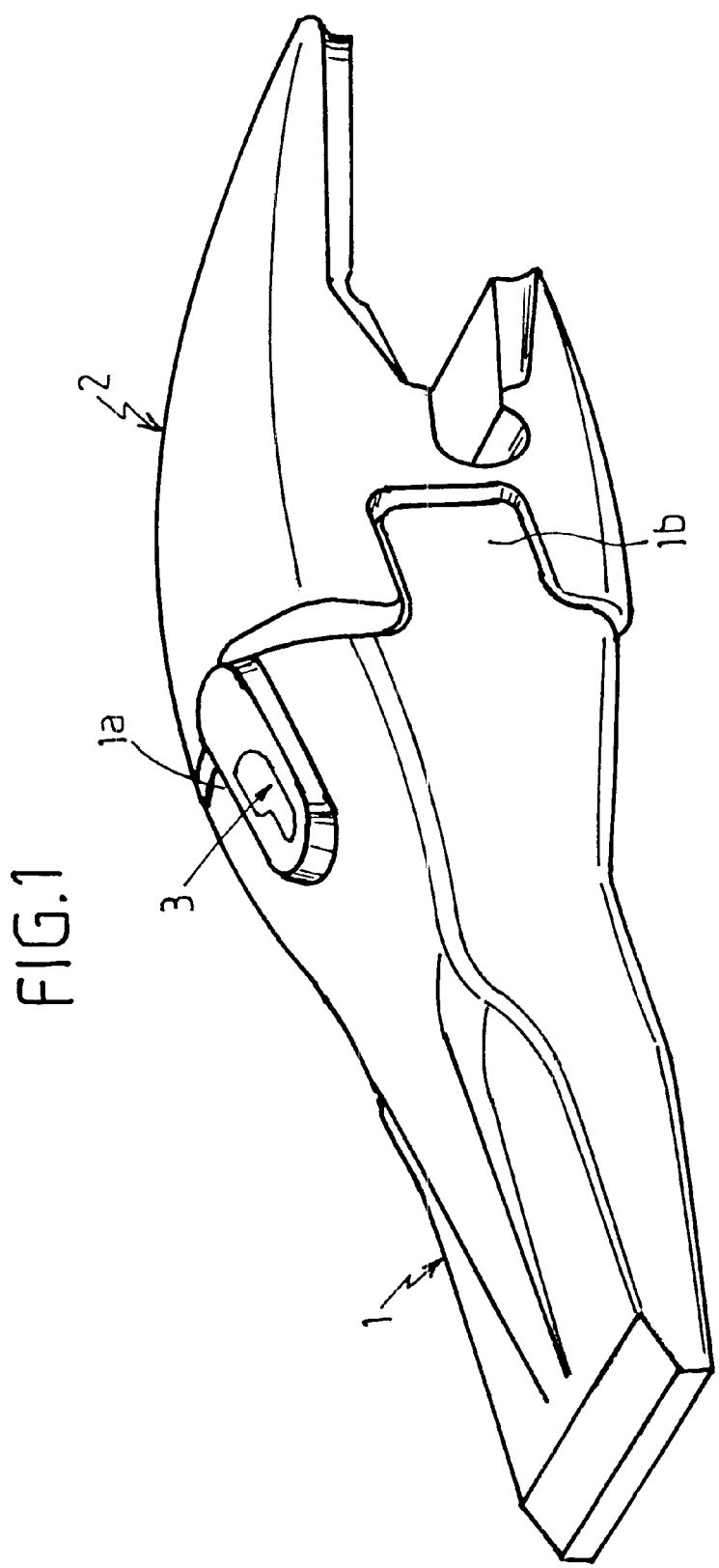
FIG. 1 is a view of tooth and adapter assembly complete with a profiled key according to the invention.
Figure 3A:
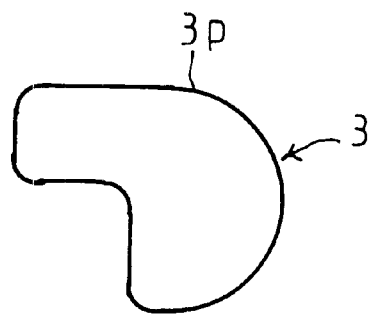
FIGS. 3a, 3b and 3c are partial views showing key sections along the lines A—A, B—B and C—C.
Figure 3B:
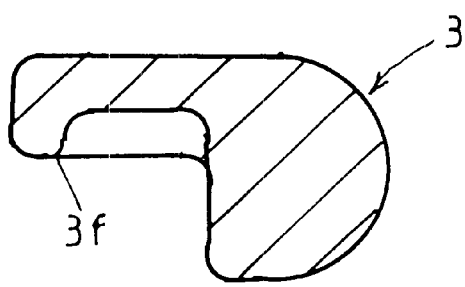
Figure 3C:
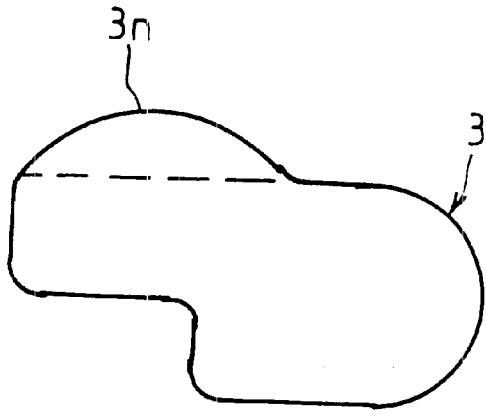
Figure 4:
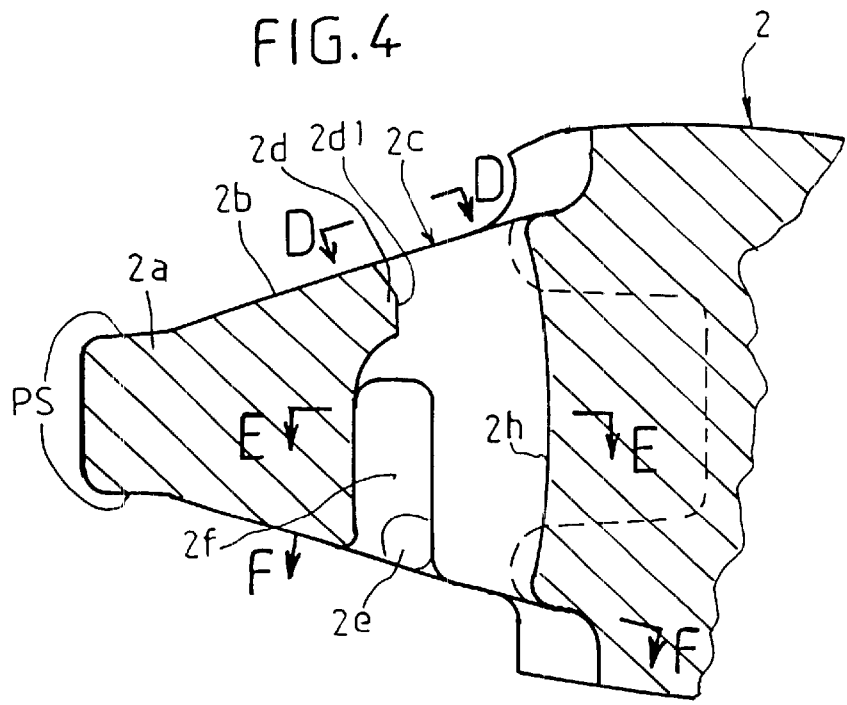
FIG. 4 is a longitudinal cross-section of the adapter showing the specific interior shapes constituting the key's area of passage.

The key (3) as shown in the drawing has a segmental curvilinear configuration with an increasing thickness (e) and a section (e1) in the top part of the key and located in the upper part of the tooth and adapter connection and a section (e2) greater than the section (e1) in the lower part of the tooth and adapter connection. The key has a rim (3a) that is curvilinear along its entire length and along only part of its thickness where an area (3b) appears designed to be opposite the front part of the assembly. As shown in FIG. 3a, we now obtain a transverse, L-shaped section from the top of the assembly on down. The lower part of the key (3c), at the point of the longitudinal curvilinear rim, is a boss (3d) the upper part of which is designed to act as a plug or stopper when the elastic filler material is inserted and the connection installed. The upper part of the key has a first strip with, on the inside, a recess (3e) designed to act as an insertion area for the filler material. The recess (3e) is a non-rectilinear configuration designed to provide the filler material with anchoring areas. The key centre is heel-shaped (3f) with a bottom end (3f1) substantially parallel to the horizontal middle axis of the key when that part is positioned between the tooth and the adapter. The heel is recessed (3g) and subsequently connected to the lower base (3m) of the key with an oblique rib (3h). The oblique direction is sufficiently marked to give the part the shape of a rifle butt. The lower base on the side of the key has a boss (3n) acting as an additional close-off area together with the tooth as will be shown later. The top and bottom edges (3p, 3r) of the key are not parallel and have an oblique configuration toward the end of the tooth.

The purpose of the highly specific key profile is to impart the key with the following functionalities and benefits:

The curvilinear shape renders it compatible with the tooth and adapter assembly systems that are designed for permitting a small amount of tooth movement in the vertical plane during digging.

The curvilinear shape allows for greater key length and bearing surface to reduce the pressure exerted on the filler material.

The risk of accidental key falls during assembly and prior to inserting the filler material is reduced.

The hollow formed by the L-shaped section of the key creates a fill and distribution channel for the elastic filler material.

A supplementary benefit resides in the fact that the lower base (3m) acts as a plug for the elastic filler material.

The shape of the key is such that it cannot be inserted the wrong way around. It is installed through the bottom opening of the tooth and cannot come out through the upper part of the assembly.

The specific shape of the key, i.e., three tooth stop and jamming areas, viz. the upper (3t) and lower (3u) ends and its oblique front (3t) forming a triangle is required to cause the key to interlock with the tooth and perform its assigned function.

The specific key configuration with notched areas (3e–3f) for the elastic filler material is designed to act upon said material by exerting both compressive and shear forces to counter the downward pressure of the material that might be exerted upon the end of the key the surface of which has been kept as small as possible to obtain optimal performance in operation.

The characteristics of the tooth are determined by the profile of the key. The tooth (1) has an opening (1f) in the top (1a) on each side of side wings (1b) through which the aforementioned profiled key is inserted. The opening has a sloping (1e) and oblique form through which the elastic filler material is injected with a bearing area (1c) for the aforementioned, L-shaped key. This opening (1f) in the tooth further acts as a notch (1g) against which rests the top end (3b) of the key.

The lower end of the tooth (1h) has a profiled opening (1m) allowing the key to be engaged from below. This profiled opening (1m) also has a sloping part (1n) that mates with the upper sloping part described before, on which the oblique rib (3h) of the key rests and locks thus being in contact with (1c). The lower opening is profiled to form another notch (1r) adjacent to the sloping part but with a different angle to mate with the shape (3m) of the key. In other words, the upper and lower openings in the walls of the tooth are symmetrical to specifically allow the key to be inserted, positioned and locked into the operating position, interlocking the key and the tooth while creating, in the top end, a channel for the elastic filler material to be injected and closing off the bottom opening, retaining the possibility of reversing the tooth.

We shall now proceed to the description of the specific adapter configuration.

The adapter (2) has a tip (2a) with a double slope and a downstream angle (2b) that provides the strength required for the critical section defined by the R-R axis located ahead of the opening through which the key is inserted. It comprises an upstream angle (2c) of lesser amplitude connecting it with the top of the adapter.

It comprises two stabiliser lands (PS) at the front and tooth wing rests (LO) at the rear that cooperate to handle the vertical forces transmitted by the tooth. It has two areas of side contact (FL) that are the permanent tooth bearing surfaces.

Figure 5:
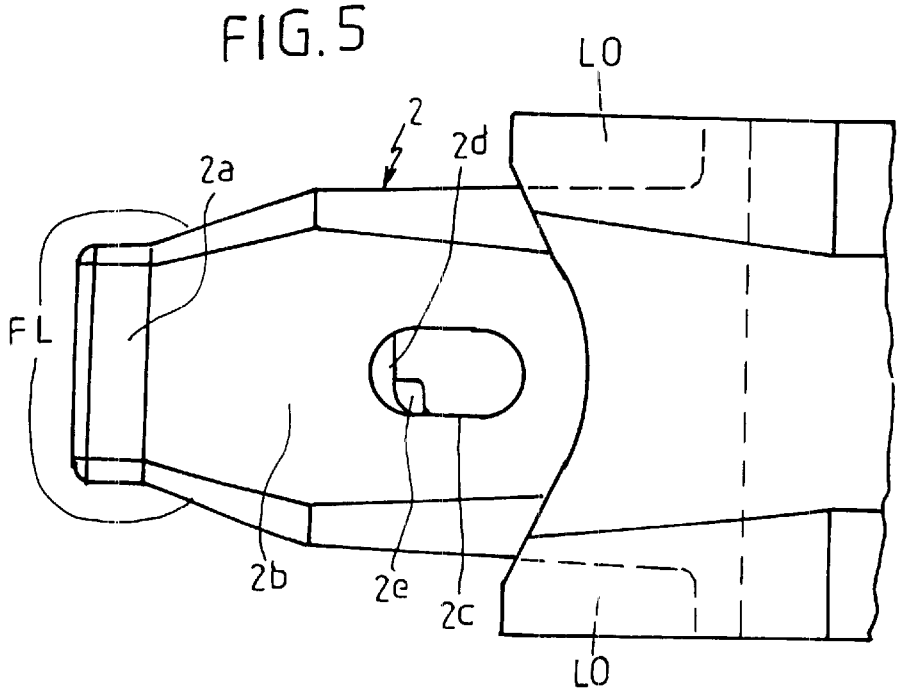
FIG. 5 is a top view of FIG. 4.
Figure 5A:
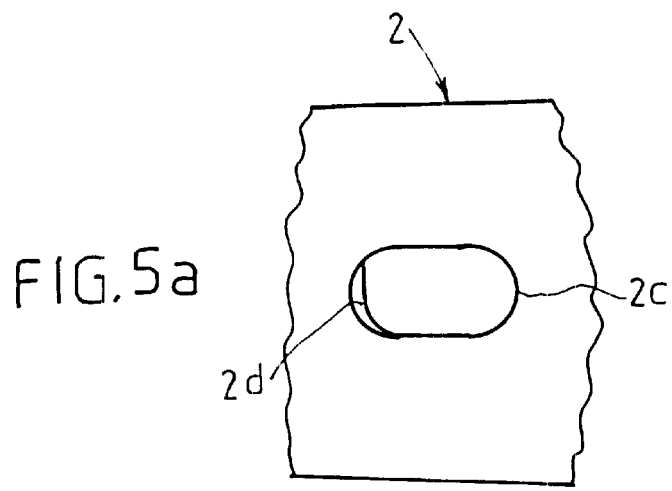
FIGS. 5a, 5b and 5c are partial and sectional views of FIG. 5b along the arrows D—D, E—E, F—F of FIG. 4.
Figure 5B:
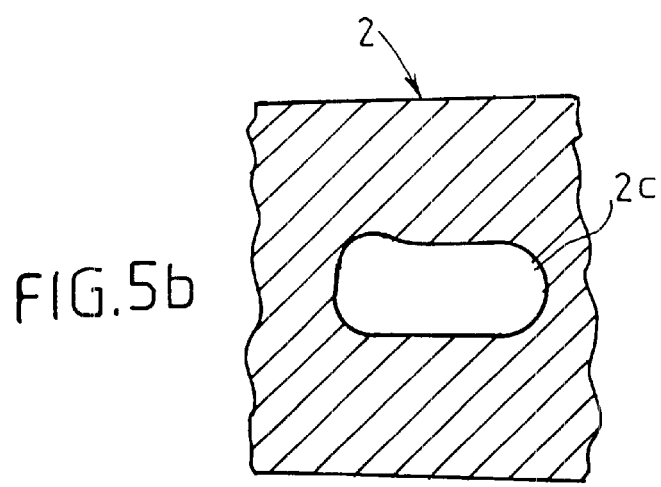
Figure 5C:
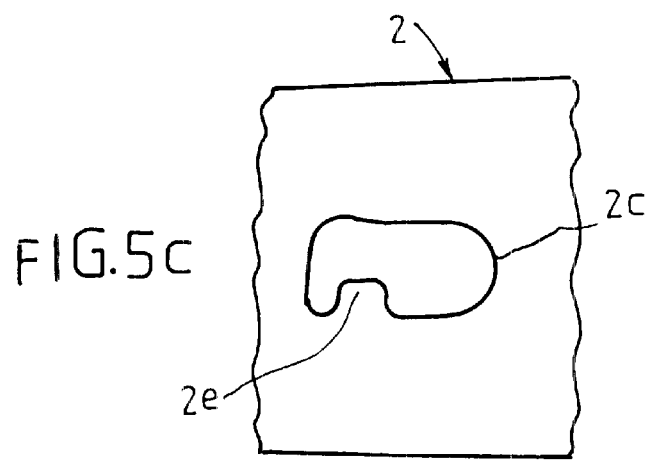
Figure 6:
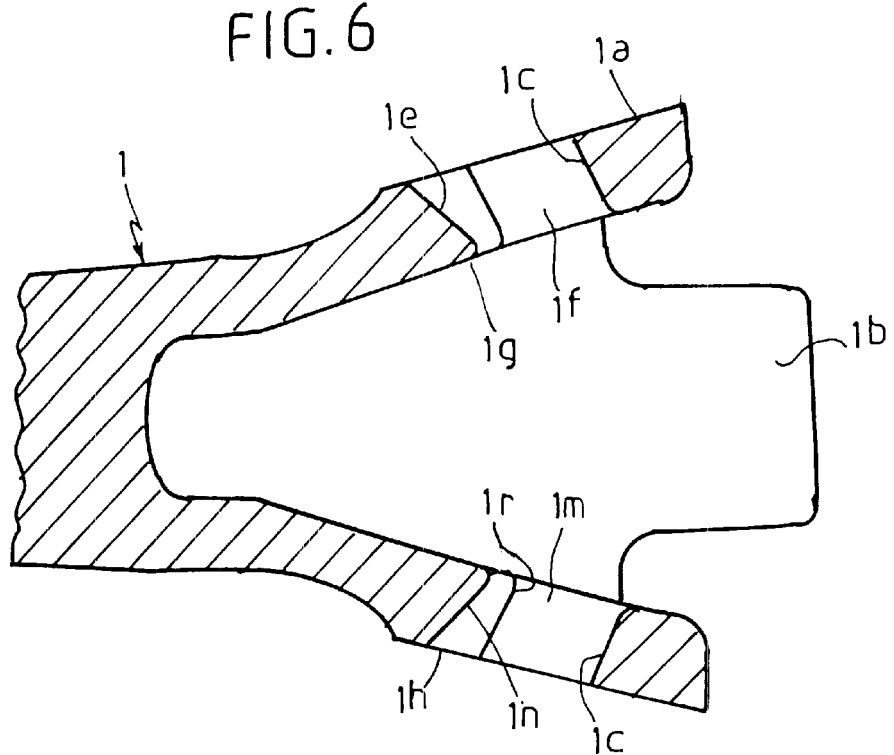
FIG. 6 is a cross-sectional view of the tooth and its interior profiles that allow the key to pass and be located.
Figure 7:
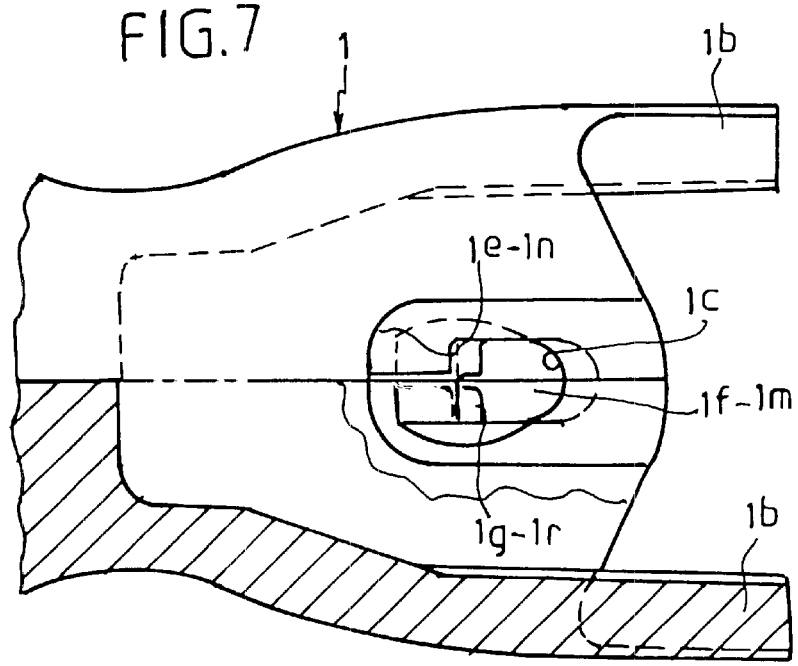
FIG. 7 is a top view of FIG. 6.
Figure 8:
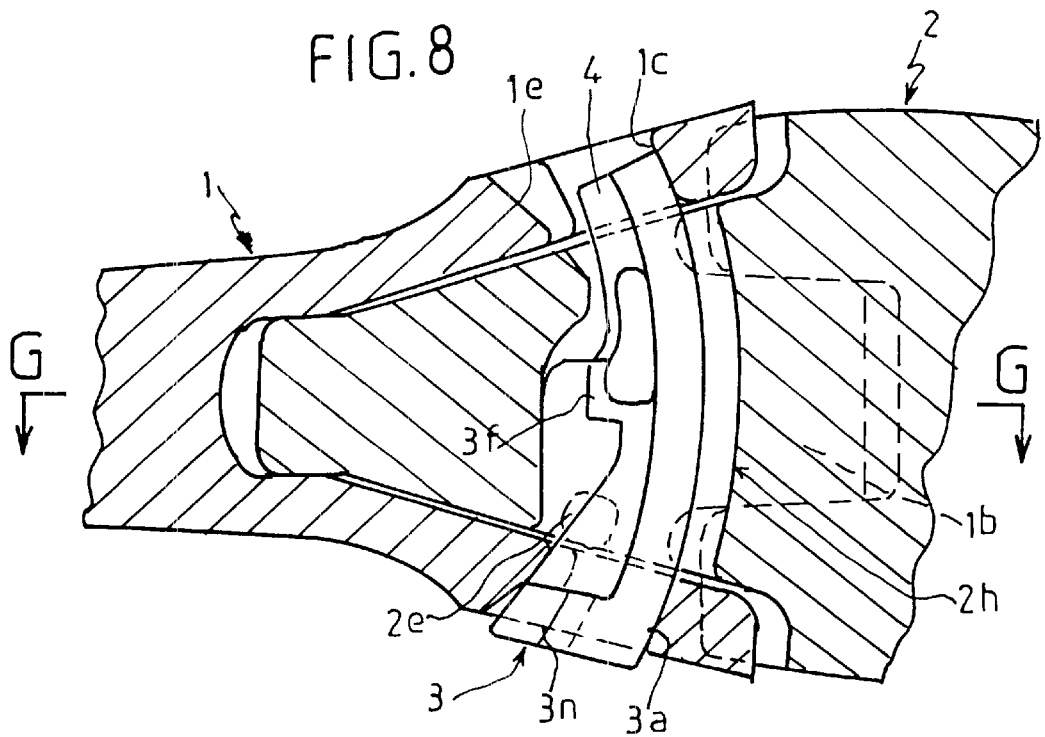
FIG. 8 is a cross-section showing the manner in which the wearing parts are assembled according to the invention.
Figure 9:
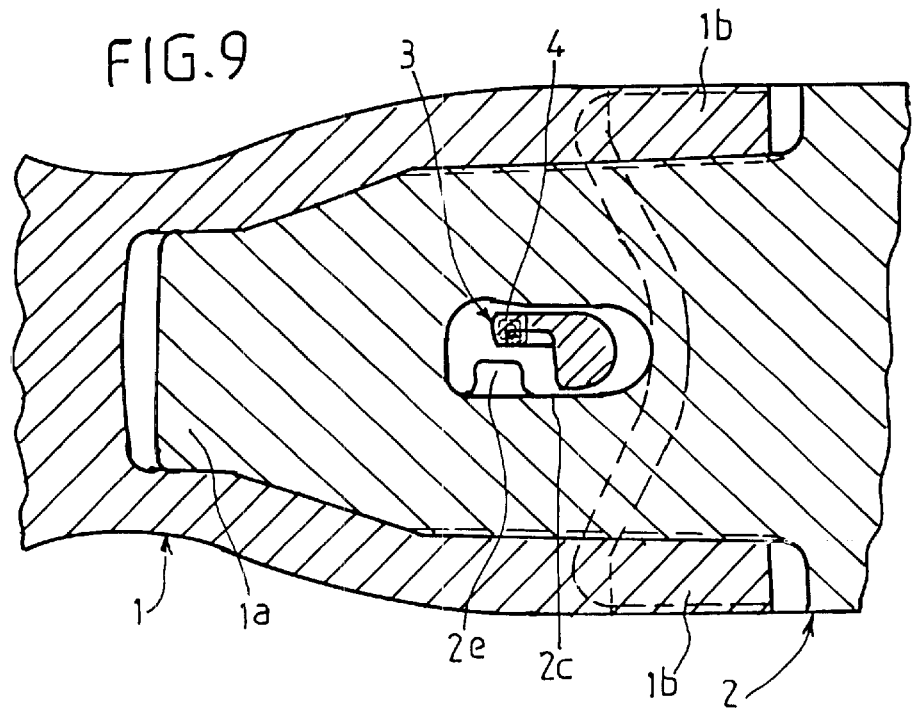
FIG. 9 is a top cross-sectional view along the line G—G of FIG. 8.

Depending upon its specificity, the adapter is shaped such that the key is located as far back as possible in the thickest and therefore strongest part of the adapter. In addition, the prominent upper (2d) and lower (2e) areas run as far as the inside of the tip of the adapter receiving the key. The apparent part (2d1) of the prominent upper area (2d) acts as a potential momentary bearing area for the key in case of extremely high pulling forces on the tooth. Area (2e) is a boss and is located on the lower part of the adapter tip. It, too, is a potential momentary bearing area for the key in case of extremely high pulling forces on the tooth. Inside, it has a chamber (2f) the successive sections of which are shown in FIGS. 5a, 5b and 5c. The inside rear of the key socket has a curvilinear configuration (2h) matching the shape of the key but not coming into contact with it. This arrangement brings the tooth wings nearer the pivot formed by the key, thus diminishing the horizontal movement of the tooth allowed by the lateral play.

The illustrations clearly show that when the cavities of the assembled teeth, adapters and keys are filled, an optimised connection is formed keeping the key perfectly in place.

A specific benefit is the fact that the key can only be removed through the bottom of the assembly. Its vertical location is facilitated by the various guiding areas. The various canted sections slope to form a leak tight barrier to the elastic filler material.

Said elastic filler material is locked in and totally fills the available space in the tooth/adapter interface and the top part of the tooth and cannot escape in any way. In the case of extremely high tooth pulling forces, the pressure exerted upon the filler material by the key will progressively increase the stiffness of said material, causing it to exert an extremely high counterpressure but becoming elastic again as pulling forces diminish, allowing the component parts (tooth, adapter and key) to assume their normal position.

The volume of the chamber (2f) is designed to hold the quantity of elastic material necessary to act as an elastic buffer, lock the key and set up a thermal mass-effect that will ensure continued grip under winter conditions using a filler material that has an exothermic polymerisation reaction.

According to another aspect of the invention the elastic filler material is selected from the following materials:

It may be a:

A mono or bicomponent system obtained from polyols, iscocyanates and/or prepolymers A polyorganosiloxan from the RTV (Room Temperature Vulcanising) silicon elastomer family, a mono- or bicomponent obtained by the hydrolysis and polycondensation of chlorosilanes with crosslinking agents and fillers.

Their shore hardness ranges from 50 to 80 Shore A.

Lastly, the specificity of the shapes of the key and the tooth and the resulting adapter optimise the use of the filler material and the connection previously defined.

Replacing a tooth is simple and fast, requiring a single tap on the top part of the key, which may then be removed from below, causing the filler material to tear. The material is easily removed by the profiled shape of the lower part of the adapter designed for the purpose; this frees the adapter socket for the next assembly.

What is claimed is:

1. Apparatus for joining a tooth to an adaptor that is mounted upon a construction tool that includes:

a tooth that is interlocked with an adaptor so that a section of the tooth overlays the adaptor in an interlocking zone, a keyway passing through the tooth and the adaptor in the interlocking zone, an elongated key that complements the shape of said keyway that is insertable within said keyway, said key being curvilinear along its length and having an L-shaped cross section, the thickness of the key increasing from one end to the opposite end thereof, said key further including recessed areas for receiving therein an elastic filler material when said key is fully inserted within said keyway and wherein said one end of said key containing a plug means for closing against the inner wall of the keyway to prevent said elastic filler material from passing between said one end of said keyway and the inner wall of the keyway.

2. The apparatus of claim 1, wherein said key further includes a curvilinear rim section that extends along the length of the key and a rib section that is perpendicular to the rim section that extends along the length of the key, said rim section and said rib section forming a channel with the keyway when the key is fully inserted within said keyway.

3. The apparatus of claim 2, wherein said rib section contains a first recessed anchoring area extending from said opposite end of the key to a raised heel for forming a recess with a keyway for containing said elastic filler material.

4. The apparatus of claim 3 wherein said rib section contains an oblique wall having an inclined top surface that extends from the raised heel back to the said one end of said key, said wail forming a second recessed anchoring area with the keyway when said key is fully inserted into said keyway for containing said elastic material.

5. The apparatus of claim 1, wherein said plug means further includes a boss at said one end of said key that is integral with the rib section and said rim section of the key for closing one end of said channel.

6. The apparatus of claim 5, wherein said raised heel is located about midway along the length of said key.

7. The apparatus of claim 6, wherein said raised heel has a top surface that is parallel with the rim section of said key.

8. The apparatus of claim 4 wherein the oblique wall of said rib section joins said heel below the top surface of said heel.

9. The apparatus of claim 8 wherein said first recess is non-rectilinear in form.

10. The apparatus of claim 2, wherein said tooth contains a pair of spaced-apart arms and the adaptor has a front end that passes between said arms to create said interlocking zone and wherein said curvilinear rim of said key is seated in contact with said keyway with said arms when the key is fully inserted within said keyway.

11. The apparatus of claim 1, wherein said elastic filler material is taken from at least one of the groups consisting essentially of a monocomponent or bicomponent polyurethane produced by polyols, iscocyanates, or prepolymers.

12. The apparatus of claim 1, wherein said elastic filler material is taken from a polyorganosiloxan from a room temperature vulcanising silicon containing a monocomponent or bicomponent produced by hydrolysis and polycondensation of chlorosilanes with crosslinking agents and fillers.

* * * * *